US011700922B2

(12) United States Patent
Davis

(10) Patent No.: US 11,700,922 B2
(45) Date of Patent: Jul. 18, 2023

(54) LIGHTWEIGHT COLLAPSIBLE CHAIR WITH TREKKING POLES SUPPORTS

(71) Applicant: Jon Kief Davis, San Marcos, CA (US)

(72) Inventor: Jon Kief Davis, San Marcos, CA (US)

( * ) Notice: Subject to any disclaimer, the term of this patent is extended or adjusted under 35 U.S.C. 154(b) by 0 days.

(21) Appl. No.: 17/367,730

(22) Filed: Jul. 6, 2021

(65) Prior Publication Data

US 2022/0000268 A1     Jan. 6, 2022

Related U.S. Application Data

(60) Provisional application No. 63/048,357, filed on Jul. 6, 2020.

(51) Int. Cl.
*A45B 5/00*     (2006.01)
*A47C 4/28*     (2006.01)
(Continued)

(52) U.S. Cl.
CPC ................ *A45B 5/00* (2013.01); *A47C 4/028* (2013.01); *A47C 4/28* (2013.01); *A47C 4/30* (2013.01);
(Continued)

(58) Field of Classification Search
CPC .. A47C 4/28; A47C 4/028; A47C 4/30; A47C 4/42; A47C 7/144; A47C 9/10; A47C 9/105; A47C 4/44; A47C 4/34; A45B 5/00
(Continued)

(56) References Cited

U.S. PATENT DOCUMENTS

| 2,712,349 | A | * | 7/1955 | Le Voir | A47C 5/06 |
| | | | | | 297/440.11 |
| 4,047,752 | A | * | 9/1977 | Rohr | A47C 4/286 |
| | | | | | 297/440.11 |

(Continued)

FOREIGN PATENT DOCUMENTS

| KR | 20160003568 U | * | 10/2016 | ............. A47C 4/022 |
| WO | WO-2017105055 A1 | * | 6/2017 | ............. A47C 4/286 |
| WO | WO-2018145039 A1 | * | 8/2018 | ............... A45B 5/00 |

OTHER PUBLICATIONS

Waddell, Logan, "Mountainsmith Slingback Chair Received 2017 Backpacker Editors' Choice Award," Outside Business Journal, Mar. 6, 2017, https://www.outsidebusinessjournal.com/press-releases/mountainsmith-slingback-chair-receives-2017-backpacker-editors-choice-award/ (accessed May 27, 2022).†

*Primary Examiner* — Robert Canfield
(74) *Attorney, Agent, or Firm* — Carla L. Garmon; Dilworth & Barrese, LLP

(57) ABSTRACT

Embodiments of chair systems incorporating trekking poles include a low-back design employing fixed-length trekking poles, and a high-back design employing adjustable-length trekking poles that allow for adjusting the recline angle of the chair. The chair system generally includes a tubular frame that releasably engages a flexible seat. The tubular frame includes a front hub and a rear hub spaced one from the other by a cross bar, plus front and rear footings which stabilize the chair system on the ground or undersurface. A V-shaped upper support extending from the front hub supports and holds open the leg portion of the flexible seat, while the trekking poles are releasably engaged with and extend upwardly from the rear hub to support, and hold open and upright the back portion of the flexible seat.

19 Claims, 18 Drawing Sheets

(51) Int. Cl.
  *A47C 4/30* (2006.01)
  *A47C 7/14* (2006.01)
  *A47C 4/42* (2006.01)
  *A47C 9/10* (2006.01)
  *A47C 4/02* (2006.01)

(52) U.S. Cl.
  CPC .............. *A47C 4/42* (2013.01); *A47C 7/144* (2018.08); *A47C 9/10* (2013.01); *A47C 9/105* (2013.01)

(58) Field of Classification Search
  USPC ........................................................ 280/812
  See application file for complete search history.

(56) References Cited

U.S. PATENT DOCUMENTS

| | | | | |
|---|---|---|---|---|
| 4,258,951 A * | 3/1981 | Groom | .................... | A47C 4/286 297/16.2 |
| 4,605,261 A * | 8/1986 | Lee | .................... | A47C 4/286 297/16.2 |
| 4,786,082 A * | 11/1988 | Swietlik | .................... | A45B 5/00 135/66 |
| 5,054,849 A * | 10/1991 | Hoff | .................... | A47C 4/286 297/440.11 |
| 5,499,857 A * | 3/1996 | Lynch, Jr. | .................... | A47C 4/286 297/16.2 |
| 5,709,428 A * | 1/1998 | Hugghins | .................... | A47C 4/48 297/16.2 |
| 7,240,961 B2 * | 7/2007 | Grace | .................... | A47C 4/38 297/16.2 |
| 8,899,686 B1 * | 12/2014 | Kim | .................... | A47C 4/286 297/440.11 |
| 9,326,612 B2 * | 5/2016 | Kim | .................... | A47C 9/10 |
| 9,351,578 B2 * | 5/2016 | Homans | .................... | A47C 4/02 |
| 9,622,554 B2 * | 4/2017 | Green | .................... | A63C 11/00 |
| 9,930,966 B2 * | 4/2018 | Yang | .................... | A47C 4/286 |
| 10,010,179 B1 * | 7/2018 | Stump | .................... | A47C 4/44 |
| 10,285,503 B2 * | 5/2019 | Graybill | .................... | A45B 5/00 |
| 10,342,351 B2 † | 7/2019 | Lenhart | | |
| 10,531,740 B2 * | 1/2020 | Graybill | .................... | A45B 5/00 |
| 11,166,530 B1 * | 11/2021 | Wilson, Jr. | .................... | A45B 5/00 |
| 11,350,755 B2 * | 6/2022 | Hu | .................... | A47C 4/38 |
| 11,369,202 B2 * | 6/2022 | Graybill | .................... | A47C 4/03 |
| 2004/0245762 A1 * | 12/2004 | Joseph | .................... | A63C 11/221 280/823 |
| 2009/0230736 A1 * | 9/2009 | Homans | .................... | A47C 7/008 297/16.2 |
| 2010/0123304 A1 * | 5/2010 | Ambuske | .................... | A63C 11/221 280/823 |
| 2010/0170547 A1 * | 7/2010 | Pietrzak | .................... | F16B 7/1454 24/457 |
| 2011/0156466 A1 * | 6/2011 | Linn | .................... | A47C 1/146 297/452.18 |
| 2011/0240078 A1 * | 10/2011 | Lenhart | .................... | F16B 7/1418 135/65 |
| 2012/0104805 A1 * | 5/2012 | Lah | .................... | A47C 9/105 297/16.1 |
| 2015/0189994 A1 * | 7/2015 | Lee | .................... | A47C 4/30 297/16.1 |
| 2015/0313330 A1 * | 11/2015 | Stevens | .................... | A47C 3/00 297/440.1 |
| 2016/0113402 A1 * | 4/2016 | Lee | .................... | A47C 4/42 297/16.2 |
| 2016/0201706 A1 * | 7/2016 | Heim | .................... | A63C 11/221 403/110 |
| 2017/0027327 A1 * | 2/2017 | Homans | .................... | A47C 1/146 |
| 2017/0311723 A1 * | 11/2017 | Lenhart | .................... | A47C 4/42 |
| 2018/0177268 A1 * | 6/2018 | D'Jay | .................... | A45B 9/02 |
| 2018/0235368 A1 * | 8/2018 | Graybill | .................... | A45B 5/00 |
| 2020/0297084 A1 * | 9/2020 | Lai | .................... | A45B 9/02 |
| 2021/0015263 A1 * | 1/2021 | Lah | .................... | A47C 4/022 |
| 2021/0052076 A1 * | 2/2021 | Graybill | .................... | A45C 13/021 |
| 2021/0196048 A1 * | 7/2021 | Leach | .................... | A47C 4/286 |
| 2021/0386204 A1 * | 12/2021 | Hu | .................... | A47C 13/00 |

\* cited by examiner
† cited by third party

LIGHTWEIGHT COLLAPSIBLE CHAIR WITH TREKKING POLES SUPPORTS

CROSS-REFERENCE TO RELATED APPLICATION

This application claims the benefit of U.S. Provisional Patent Application 63/048,357 entitled LIGHTWEIGHT COLLAPSIBLE CHAIR WITH TREKKING POLES SUPPORTS filed Jul. 6, 2020. The provisional application is incorporated by reference in its entirety.

BACKGROUND OF THE INVENTION

The present invention relates to outdoor recreational equipment, and more specifically, to lightweight and compact collapsible chairs with trekking poles supports.

Lightweight and compact gear is critical to many sports but is especially important to outdoor enthusiasts such as hikers and backpackers who must carry their own equipment, typically on their backs. For this reason multi-purpose equipment such as water bottles that filter water and cooking pots designed to be eaten out of are desirable because they minimize the weight and volume one must carry.

Trekking poles are a popular accessory among hikers and backpackers. They are used to assist walkers with their rhythm and to provide stability on rough terrain. Chairs are another desirable accessory but tend to be either too bulky and heavy to haul long distances, or too small and flimsy to comfortably support the user. For this reason many outdoor enthusiasts simply forego a chair and find other ways, less comfortable ways, to sit and rest.

As can be seen, there is a need for a hiking and backpacking chair that is lightweight and compact, yet sturdy. It is desirable that this chair incorporates equipment that a hiker/backpacker is already carrying so as to minimize additional weight and bulk. It is also desirable that this chair is comfortable, adjustable, and easy to use.

SUMMARY OF THE INVENTION

The present invention relates to lightweight and compact chair systems that incorporate trekking poles. Embodiments include a low-back design employing fixed-length trekking poles, and a high-back design employing adjustable-length trekking poles that allow for adjusting the recline angle of the chair. The low-back design is generally lighter and more compact than the high-back design. The chair system generally includes a tubular frame interconnected with a shock cord that is unfurled to stabilize a releasably engageable flexible seat. The tubular frame includes a front hub and a rear hub spaced one from the other by a cross bar, as well as front and rear footings which stabilize the chair system on the ground or undersurface. A V-shaped upper support extending from the front hub supports and holds open the leg portion of the flexible seat, while the trekking poles are releasably engaged with and extend upwardly from the rear hub to support, and to hold open and upright the back portion of the flexible seat.

DETAILED DESCRIPTION OF THE INVENTION

As used herein, the following structure numbers shall refer to the various structures of the invention as depicted in the figures:

10—Chair system;
    20—Flexible seat;
    22—Front sleeve;
    24—Rear sleeve;
    27—Back portion;
    28—Leg portion;
    30—Front hub;
    31—Front hub aperture;
    32—Tubular frame;
    33—Shock cord;
    34—Upper support;
    35—Cross bar
    36—Front footing;
    40—Rear hub;
    41—Rear hub aperture
    45—Centering member;
    46—Rear footing;
    50—Trekking pole;
    51—Gripping portion;
    52—Handle;
    53—Elongated member;
    54—Elongation segments;
    55—Length lock;
    57—Tip;
    58—End cap;
    59—Bootie; and
    60—Stuff sack.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention is a lightweight and compact collapsible chair system with trekking pole supports. As used herein, "lightweight" shall refer to a fully assembled chair system that weighs less than approximately 1,000 grams, and "compact" shall refer to a disassembled and packed chair system, not including the trekking poles, having a total volume less than 350 square inches for the high-back embodiment and less than 125 square inches for the low-back embodiment. The chair system includes a flexible seat that is stabilized and supported by a tubular frame that is engaged with a front hub and a rear hub. The back portion of the flexible seat is further supported and held in an upward position by a pair of trekking poles removably engaged with the back hub. Front and rear footings that extending from the front and rear hubs, respectively, stabilize the chair system on the ground or undersurface.

Figure 19:
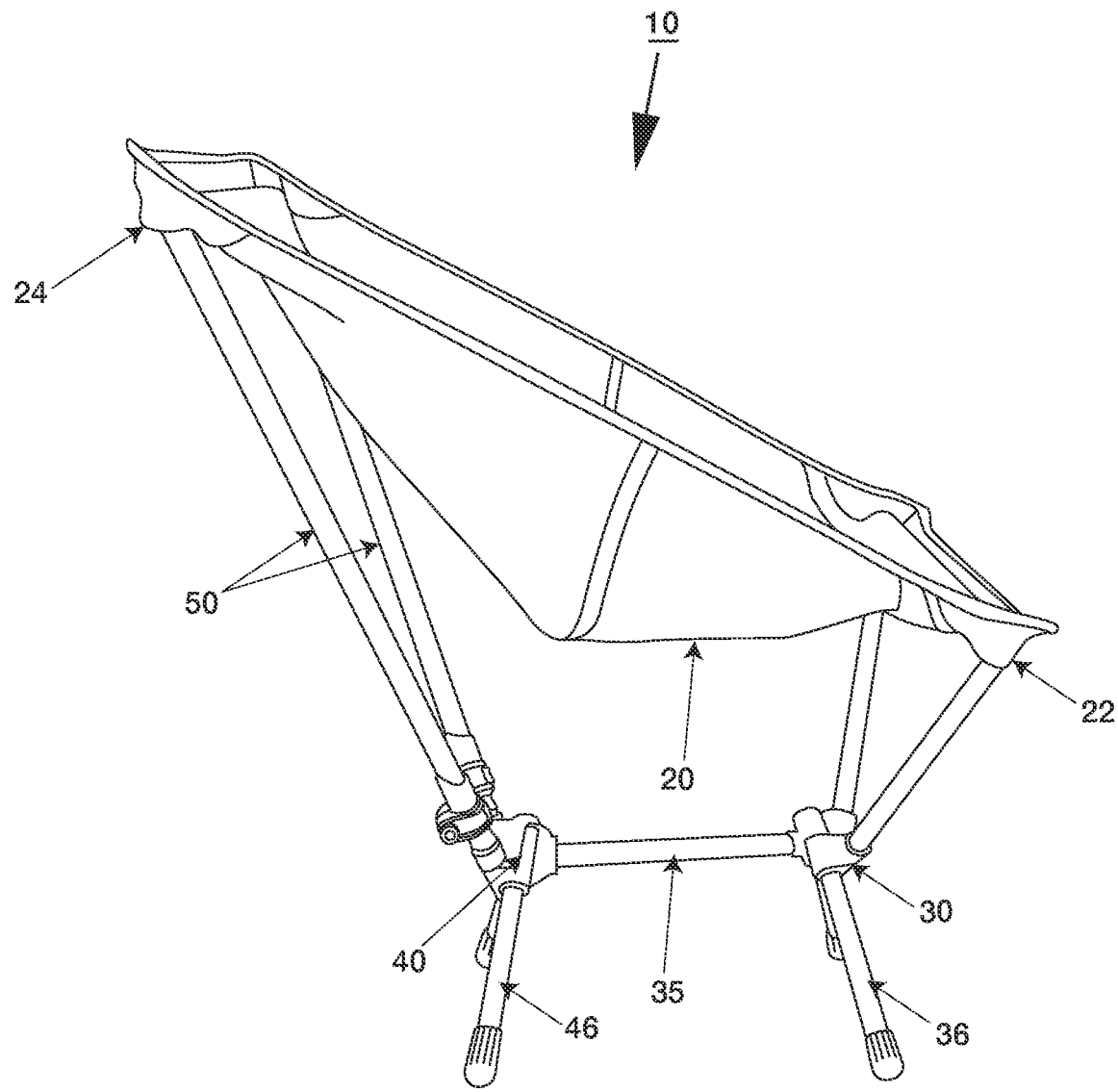
FIG. 19 is a side view of a low-back embodiment.

The scope of this invention includes a "high-back" embodiment, and a "low-back" embodiment specifically depicted in FIG. 19. These embodiments differ insofar as the high-back embodiment has a higher seat back portion, which provides support of the head and shoulders regions of the user. Additionally, the high-back seat recline angle may be adjusted, depending on preference, by varying the length of the trekking poles using a length lock mechanism. The low-back embodiment has a lower seat back portion and employs fixed-length trekking poles, and therefore doesn't have an adjustable recline angle. It should be noted that in the low-back embodiment the trekking poles themselves may be of adjustable length, but a specific length is required for use in the chair system. The structures of the two embodiments will be used interchangeably herein unless otherwise noted.

Figure 1:
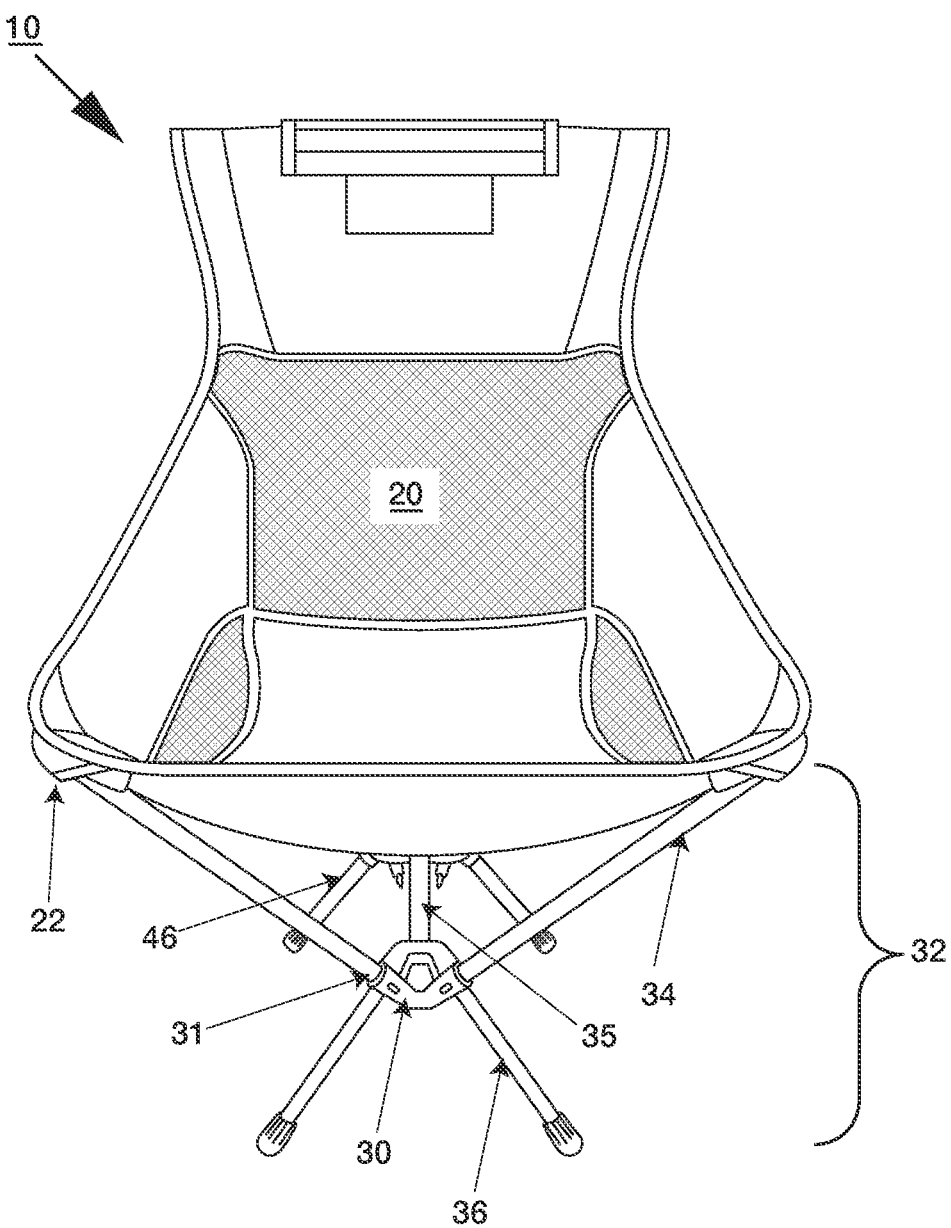
FIG. 1 depicts a front view of the high-back embodiment in the reclined position.
Figure 2:
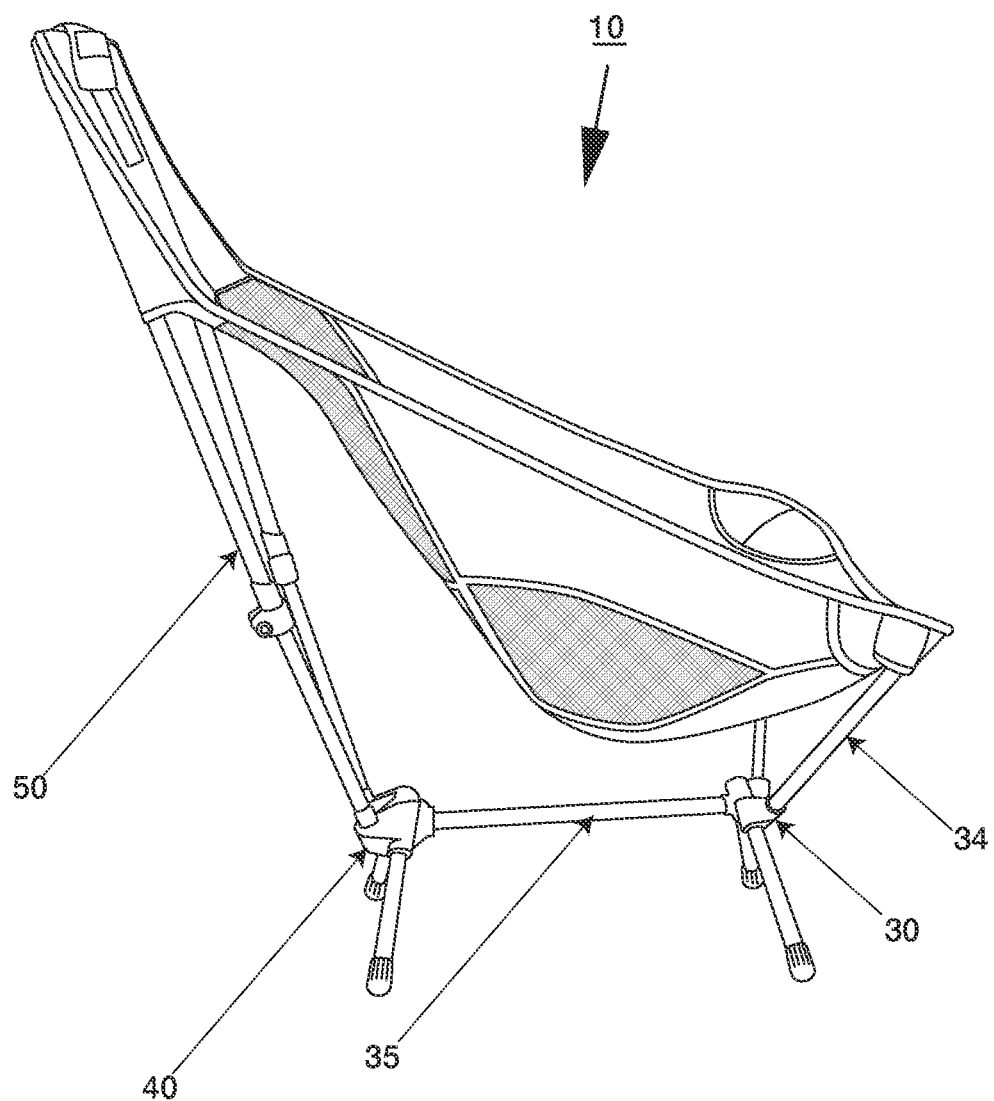
FIG. 2 depicts a side view of the high-back embodiment without trekking pole handles.

Referring to FIG. 1, chair system 10 generally includes flexible seat 20 supported by tubular frame 32 and trekking poles 50 (see FIG. 2). As shown in FIG. 2, tubular frame 32 is stabilized towards the front of the chair by front hub 30 and towards the rear of the chair by rear hub 40. Front and rear hubs 30, 40 are connected one to the other by cross bar 25. Front hub apertures 31 releasably receive and engage tubular frame 32.

Figure 11:
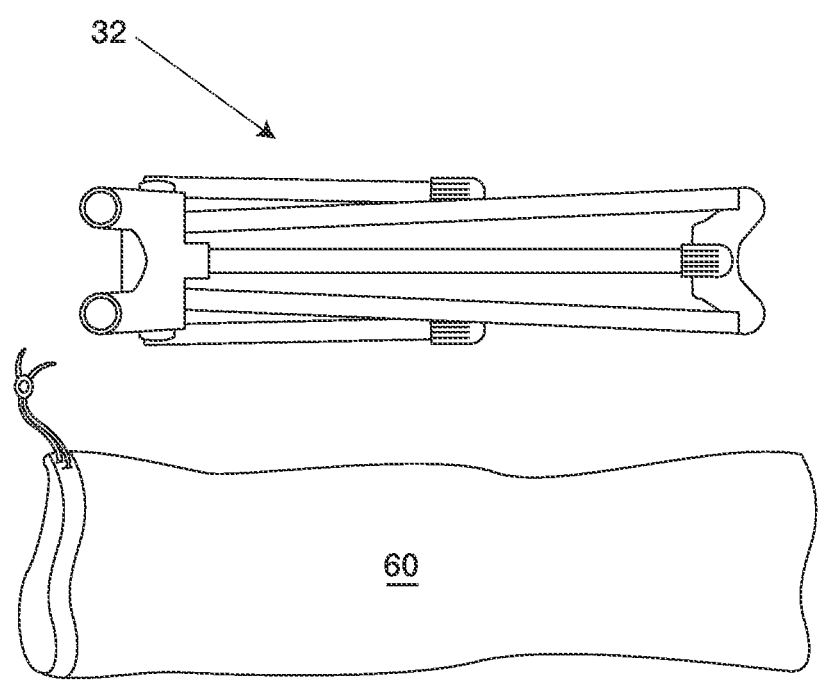
FIG. 11 depicts a collapsed frame and stuff bag.
Figure 12:
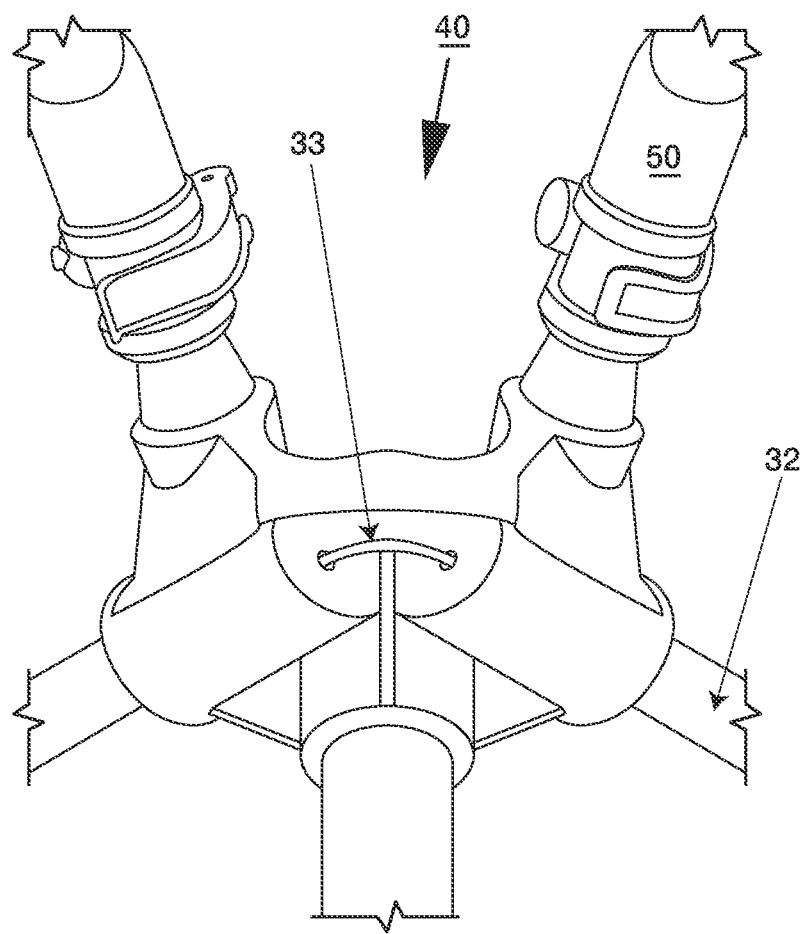
FIG. 12 depicts a top view of a rear hub.

Tubular frame 32 includes a plurality of upper supports 34 projecting upwardly from front hub 30 to secure front portion of flexible seat. Upper supports 34 are preferably releasably engaged with flexible seat 20 at front sleeves 22. Referring to FIG. 12, tubular frame 32 preferably includes shock cord 33 within, thereby allowing the assembly to be broken down yet held in position for easy reassembly, as shown in FIG. 11.

Figure 5:
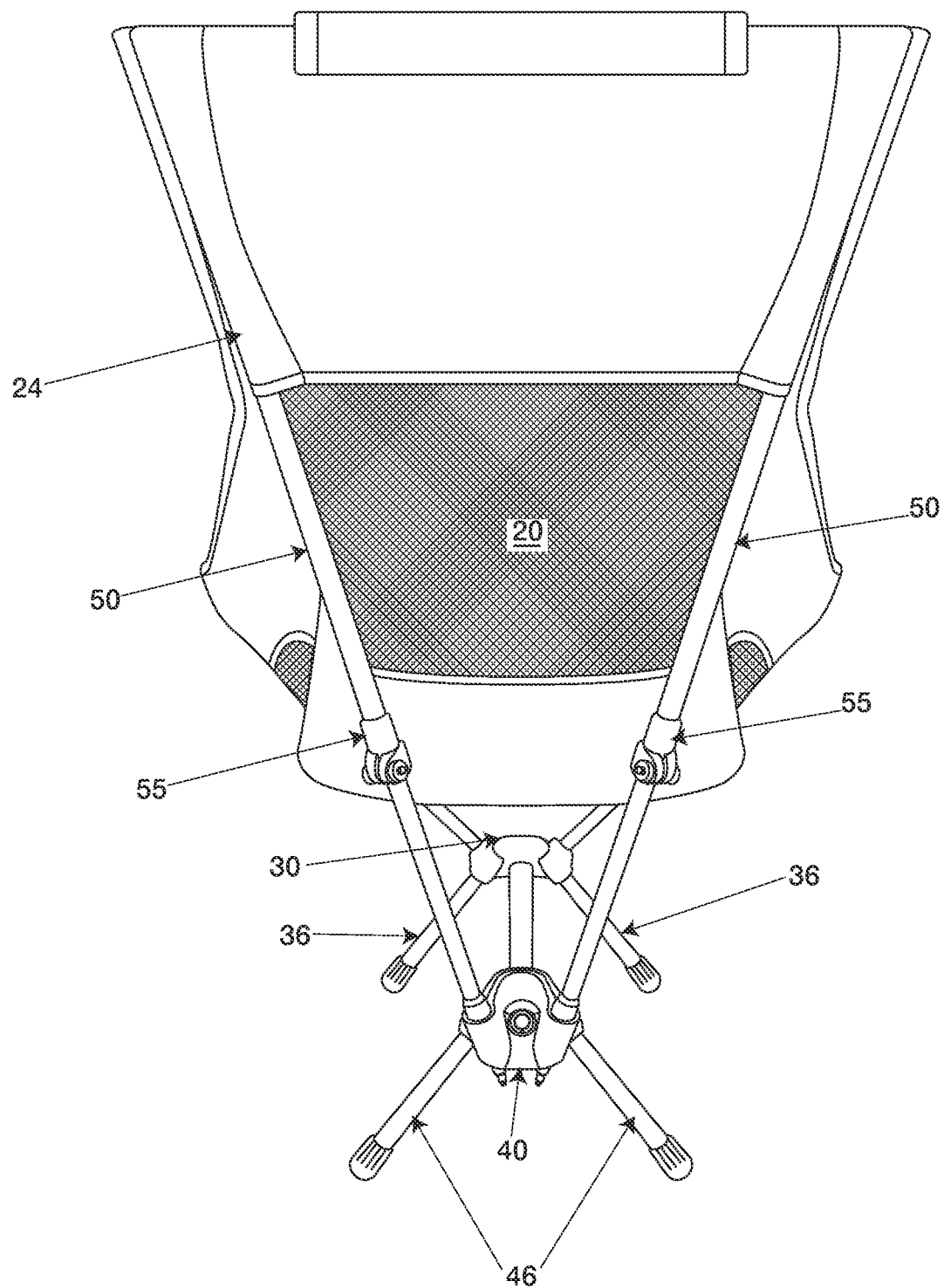
FIG. 5 depicts a rear view a high-back embodiment with trekking poles extended to their middle position.
Figure 13:
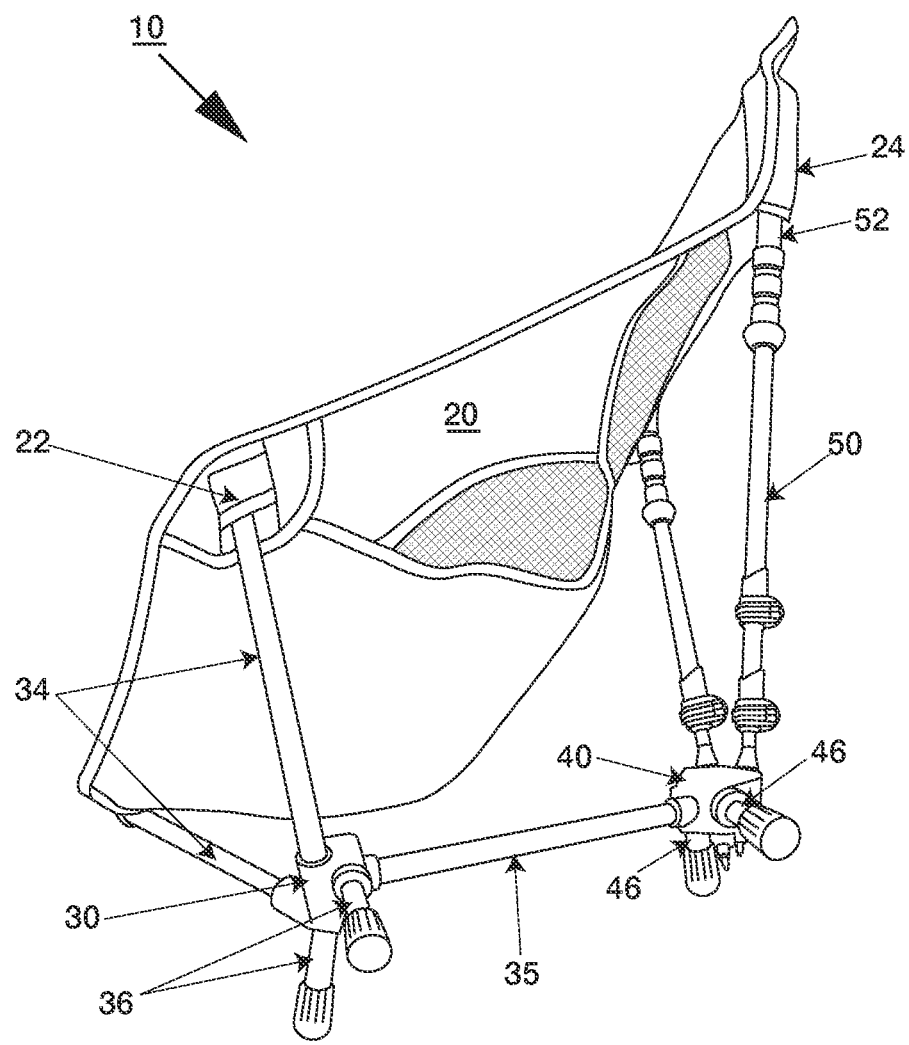
FIG. 13 depicts a side bottom perspective view of an embodiment with short front and rear footings.

Referring to FIG. 5, a plurality and preferably two trekking poles 50 project upwardly from rear hub 40 to secure rear/back portion of flexible seat 20. Trekking poles are preferably releasably engaged with flexible seat at rear sleeves 24. Note that that trekking poles can be inserted into the rear sleeves with or without handles 52, as shown in FIGS. 13 and 5 respectively.

Referring back to FIG. 5, a plurality and preferably a pair of front footings 36 project downwardly from front hub 30 and a plurality and preferably a pair of rear footings 46 project downwardly from rear hub 40. These footings stabilize the chair on the ground or whatever subsurface the chair rests on. In a preferred embodiment the footings terminate in a non-skid material such as rubber.

Figure 6:
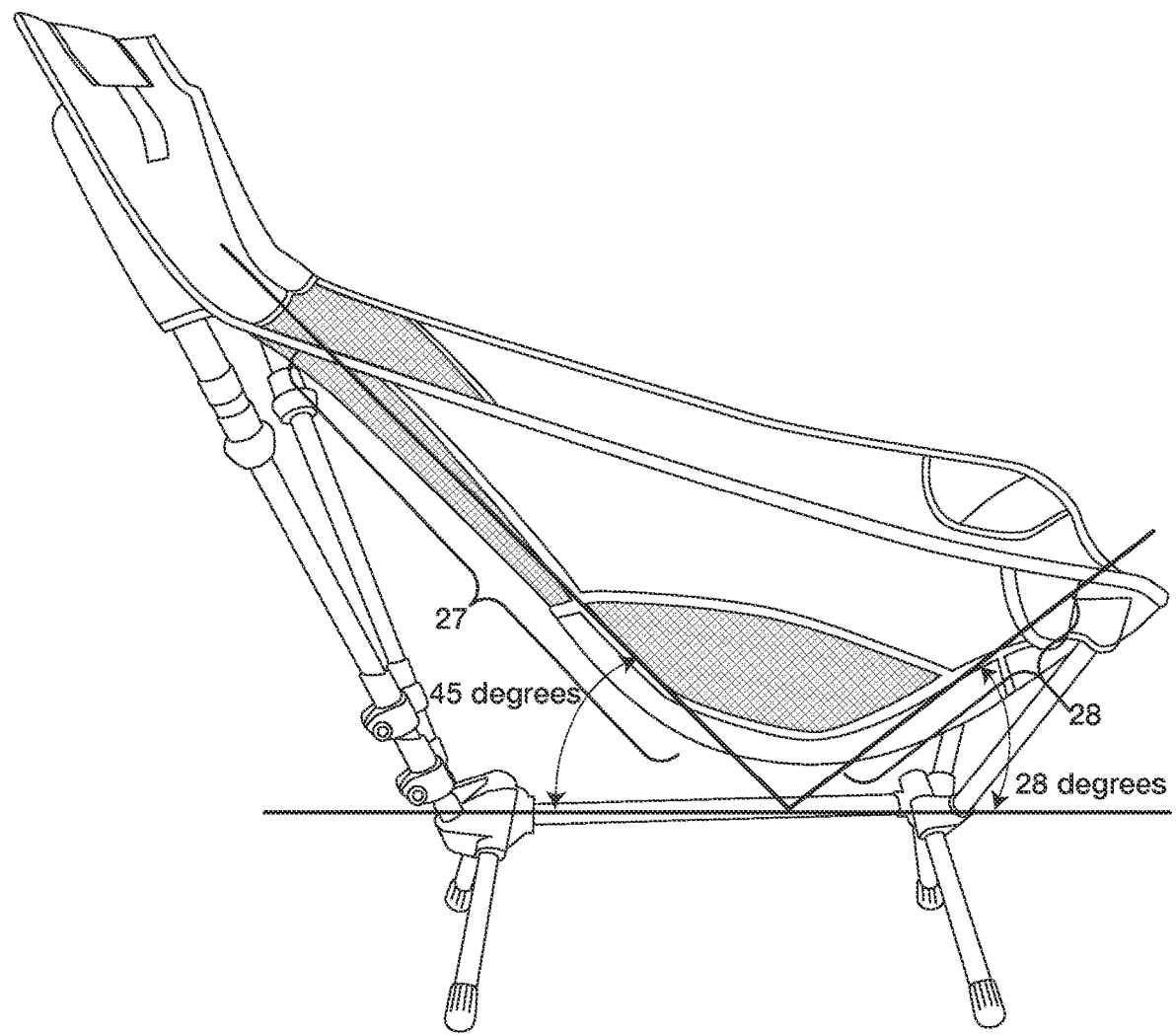
FIG. 6 depicts a side view of a high-back embodiment in the reclined position.
Figure 10:
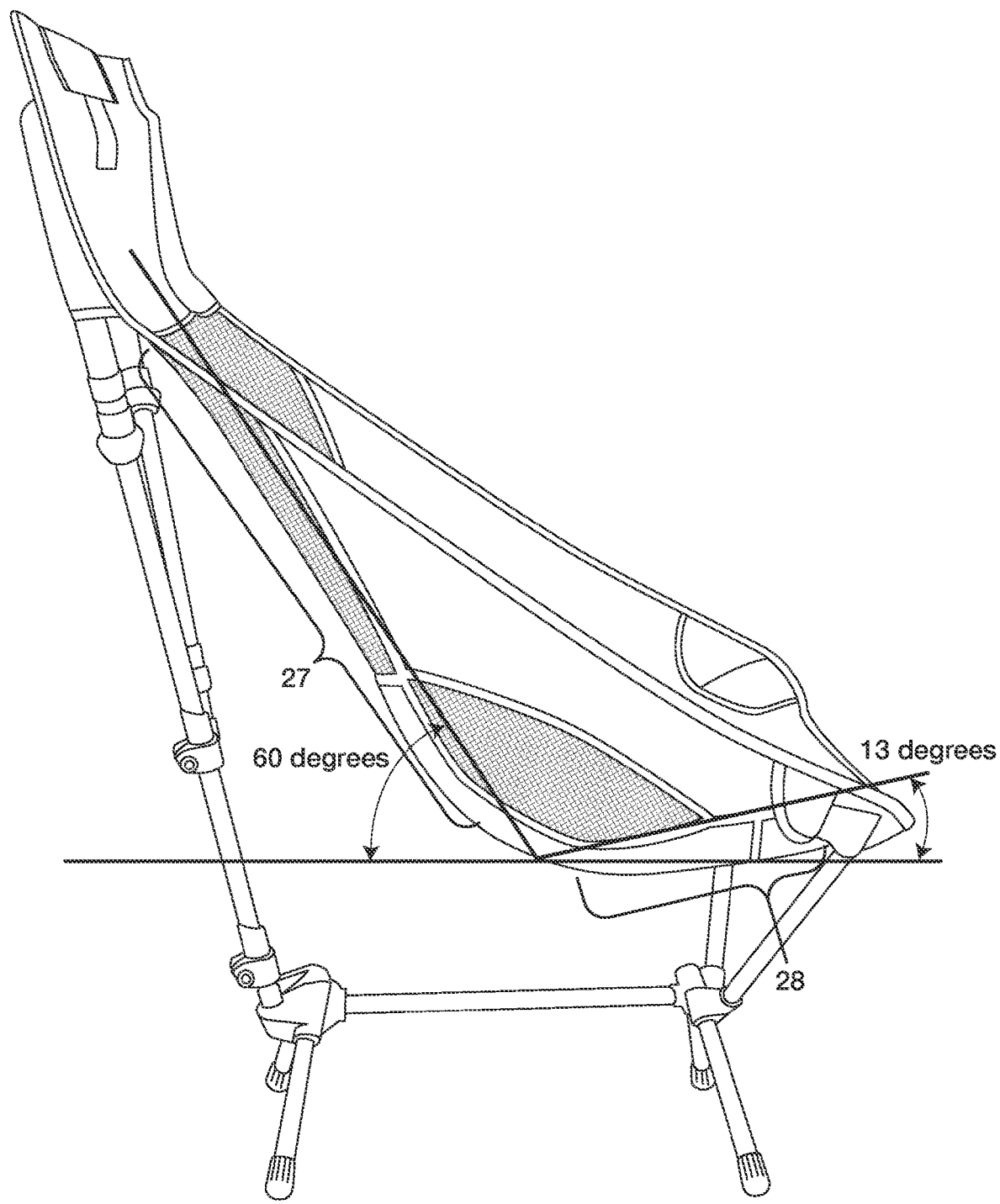
FIG. 10 depicts a side view of a high-back embodiment in the upright position.

As shown in FIG. 5, each trekking pole 50 preferably includes at least one length lock 55 for securing length-adjustable poles at a fixed length. By varying the length of trekking poles 50 a user can configure the chair system to be in a reclined or upright position as depicted in FIGS. 6 and 10 respectively. Referring to FIG. 6, in a preferred embodiment shortened trekking poles create a reclining position where back portion 27 is approximately 45° and leg portion 28 is approximately 28° relative to horizontal plane, for example the ground, and assuming chair system is in even position. Conversely, FIG. 10 depicts a preferred embodiment using elongated trekking poles to create an upright position where back portion 27 is approximately 60° and leg portion 28 is approximately 13° relative to horizontal plane. It should be understood that the length of the poles are variable between shortened and elongated position, therefore the back can be positioned anywhere between approximately 45° and approximately 60°, and the leg portion can be anywhere between approximately 28° and approximately 13°. Said another way the system is configured so a user can adjust the chair to be upright, semi-upright, neutral, semi-reclined, reclined and all variations between.

Figure 3:
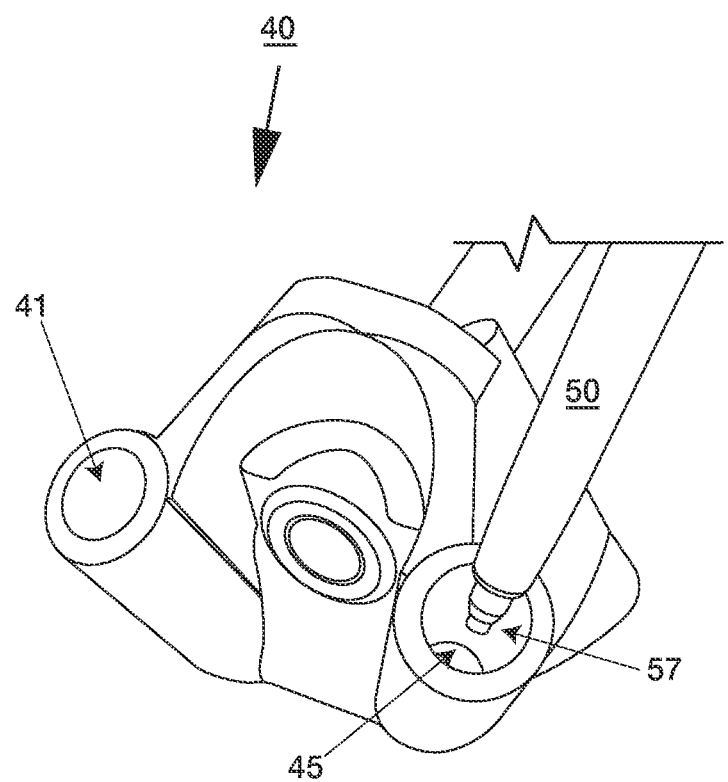
FIG. 3 depicts the rear hub of a high-back embodiment with partially inserted trekking poles.
Figure 4:
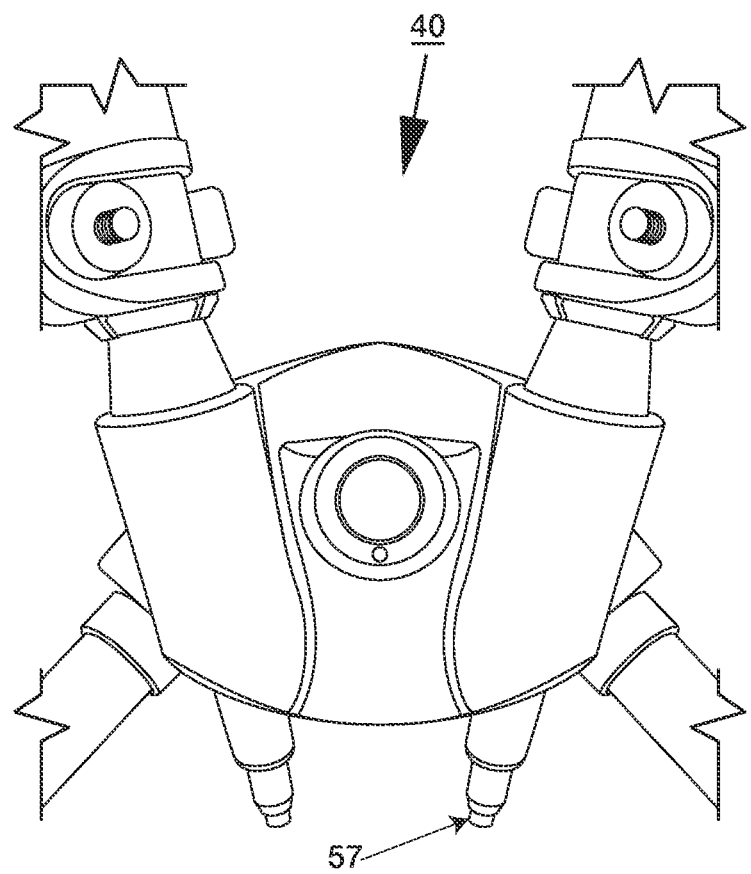
FIG. 4 depicts the rear hub of a high-back embodiment with trekking poles fully inserted.

Referring to FIGS. 3 and 4, rear hub 40 releasably receives tips 57 of trekking pole into rear hub apertures 41. Apertures 41 preferably include centering member 45 to guide tips 57 into proper position. Centering member may include foam or rubber or another resilient yet deformable material, or may define a smaller diameter channel within rear hub aperture, or may be a downwardly tapering conical structure. In a preferred embodiment rear hub apertures have dimensions of approximately 50 mm to approximately 57 mm deep, and a diameter of approximately 16 mm to approximately 16 mm at the top, and approximately 12.2 mm to approximately 11.2 mm at the bottom. The rear hub aperture preferably releasably receives tips 57 having dimensions of approximately 72 mm tall, and a diameter of 15.2 mm at the top and approximately 10 mm at the bottom based on diameter of plastic tip or 3.8 mm at the bottom based on carbide tip diameter.

Figure 7:
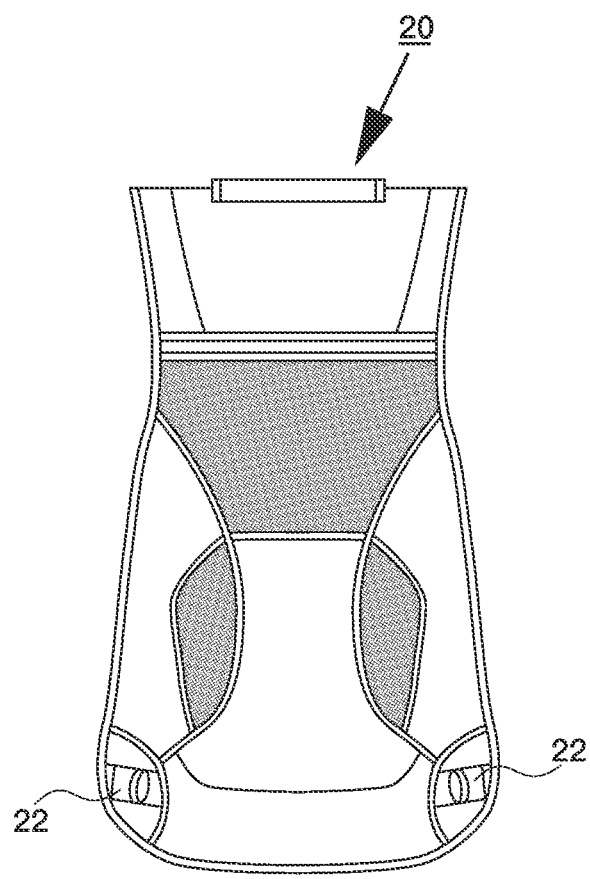
FIG. 7 depicts a bottom view of a flexible seat of a high-back embodiment.
Figure 8:
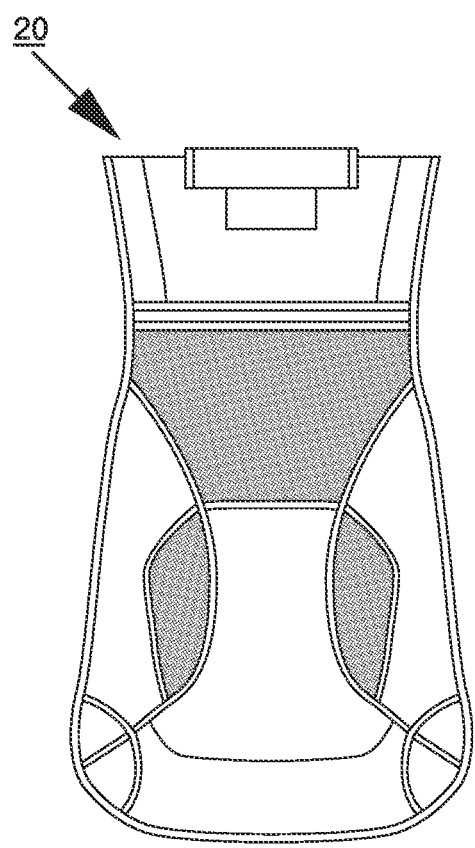
FIG. 8 depicts a top view of a flexible seat of a high-back embodiment.
Figure 9:
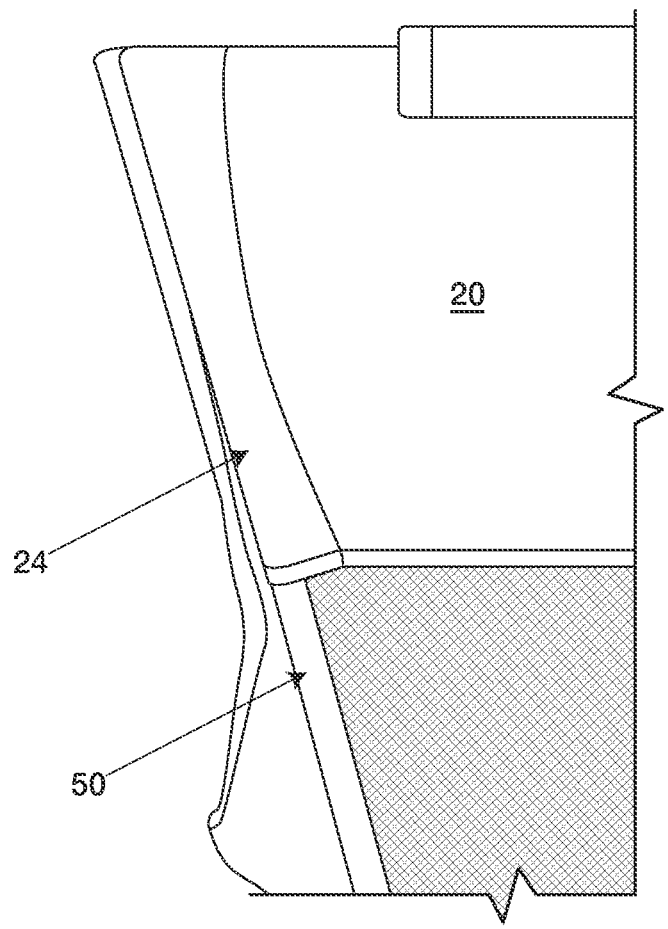
FIG. 9 depicts a flexible seat of a high-back embodiment with a handle-less trekking pole inserted.

Flexible seats 20, for example those depicted in FIGS. 7 and 8, are preferably constructed of lightweight material such as polyester fabric, mesh, and ripstop nylon. Examples of commercially available flexible seats suitable for the chair system of the present invention include Big Six Camp Chair from Big Agnes in Steamboat Springs, Colo.; Chair Two from Helinox in San Francisco, Calif.; and Flexlite Camp Dreamer from REI in St Kent, Wash. In a preferred embodiment 600*d* weight material is used to construct the flexible seat of a high-back embodiment while lightweight ripstop nylon is used to construct the flexible seat of a low-back embodiment.

It is preferred that the high-back embodiment, not including the trekking poles, can be packed to occupy a volume of approximately 18"×4.5"×4", and the low-back embodiment, not including trekking poles, can be packed to occupy a volume of approximately 12.75"×2.5"×3.5". Both embodiments can preferably support users having a maximum weight of approximately 250 to approximately 265 lbs.

In a preferred embodiment, the packed weight of the high-back embodiment, not including trekking poles, is preferably no greater than approximately 27 oz. In a preferred embodiment the packed weight of the low-back embodiment is preferably no greater than approximately 14 oz. Trekking poles weigh approximately 3.56 ounces each, which would add approximately 7.2 ounces to the weight of the fully assembled chairs.

Figure 14:
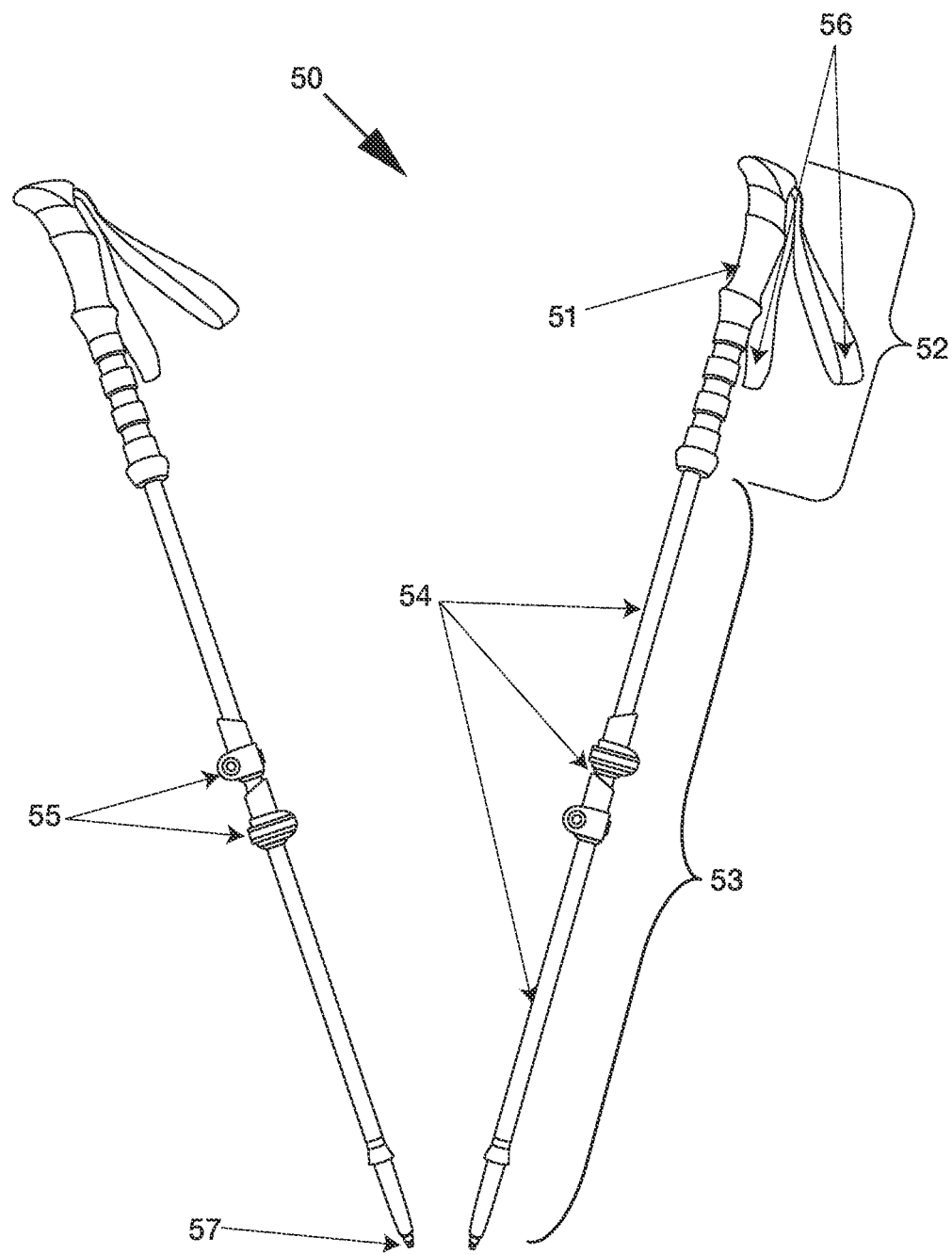
FIG. 14 depicts a pair of trekking poles of the present invention.
Figure 16:
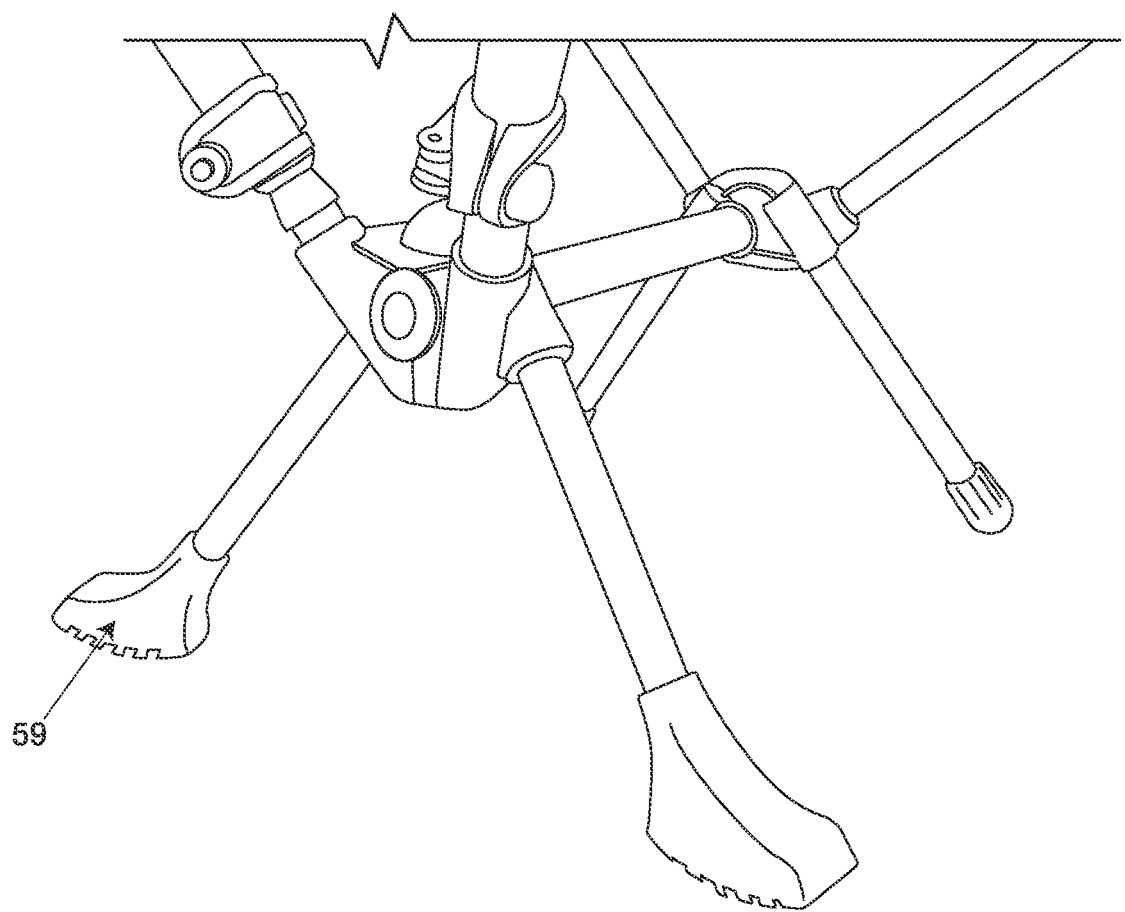
FIG. 16 depicts booties.
Figure 17:
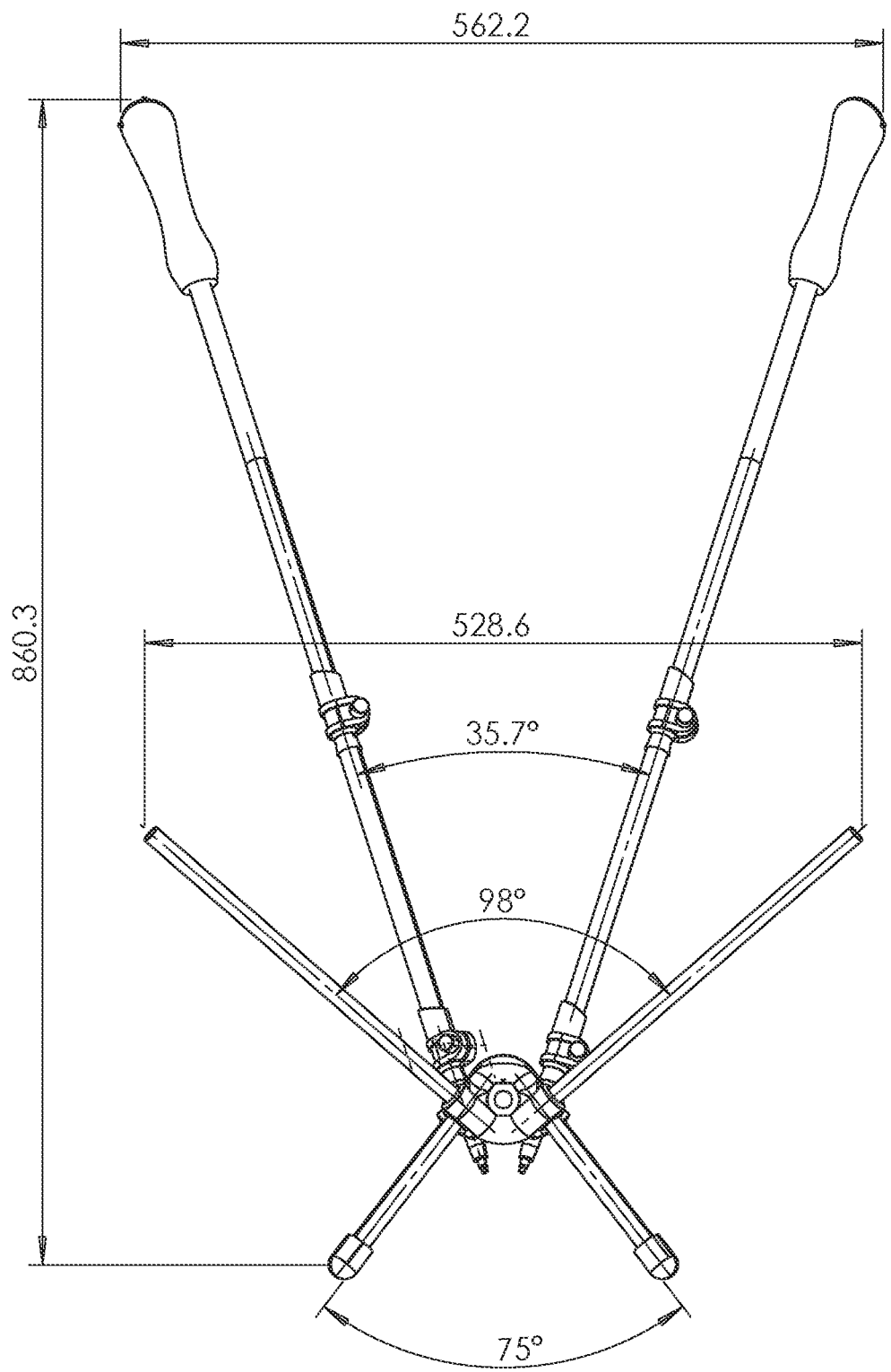
FIG. 17 is a front view engineering drawing including some preferred specifications.
Figure 18:
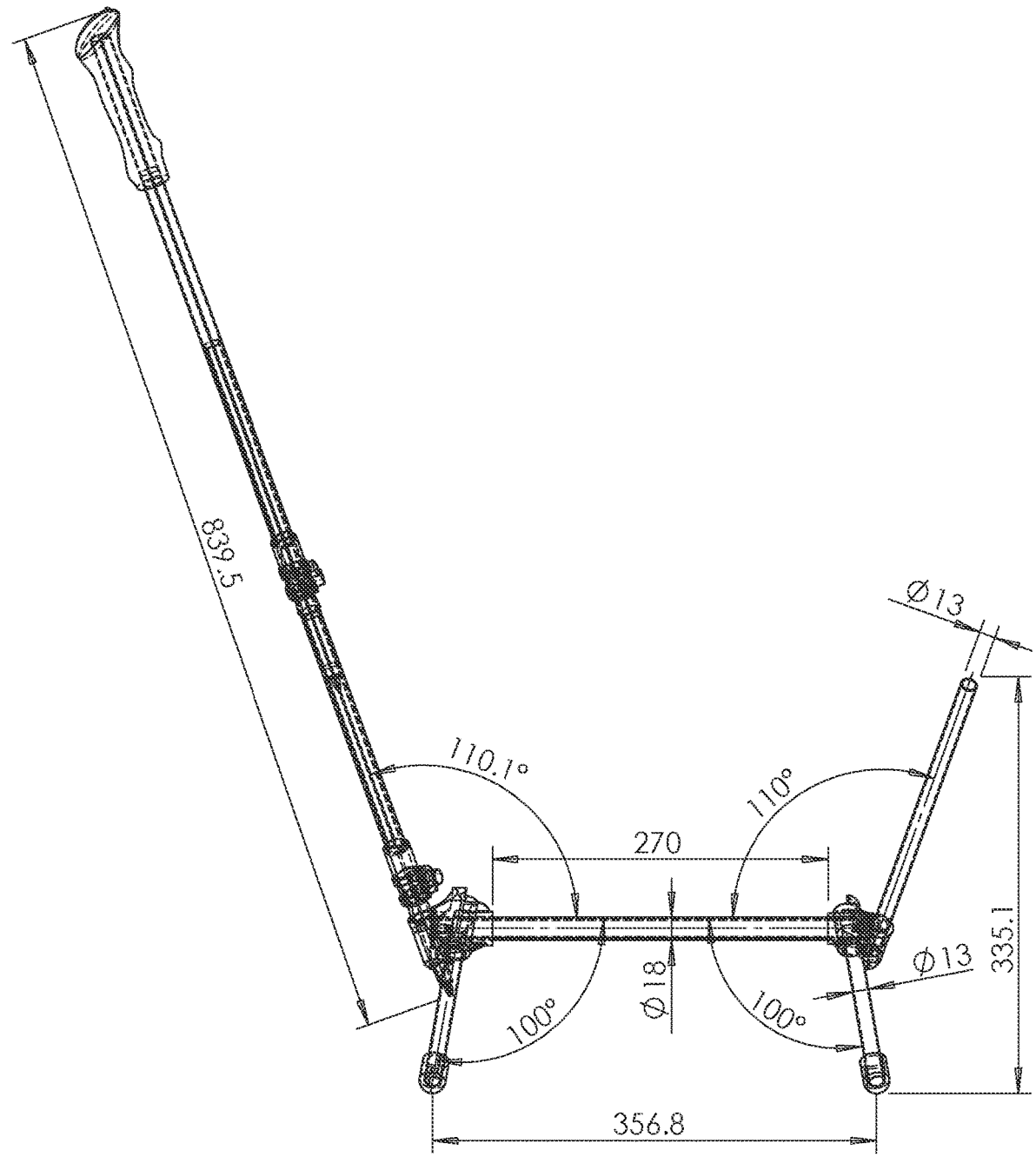
FIG. 18 is a side view engineering drawing including some preferred specifications.

The present invention can incorporate many models of commercially available trekking poles, or more preferably, utilizes trekking poles of the present invention which are set forth in FIG. 14. Trekking poles 50 of the present invention preferably include removable handles 52 that define gripping portions 51, three telescoping elongation segments 54 that comprise elongated member 53, two length locks 55, preferably flip locks, to hold elongation segments in position, at least one loop 56, and tips 57, which are preferably pointed. In a preferred embodiment the trekking poles of the present invention are constructed of a carbon fiber, have flip locks (not shown) to secure handles, and include removable booties 59 (FIG. 16) that cover the tip surface, for using trekking poles on varied terrain such as asphalt. Booties serve the additional purpose of being interchangeable with the terminations on rear footing for use on soft surfaces such as sand.

Figure 15:
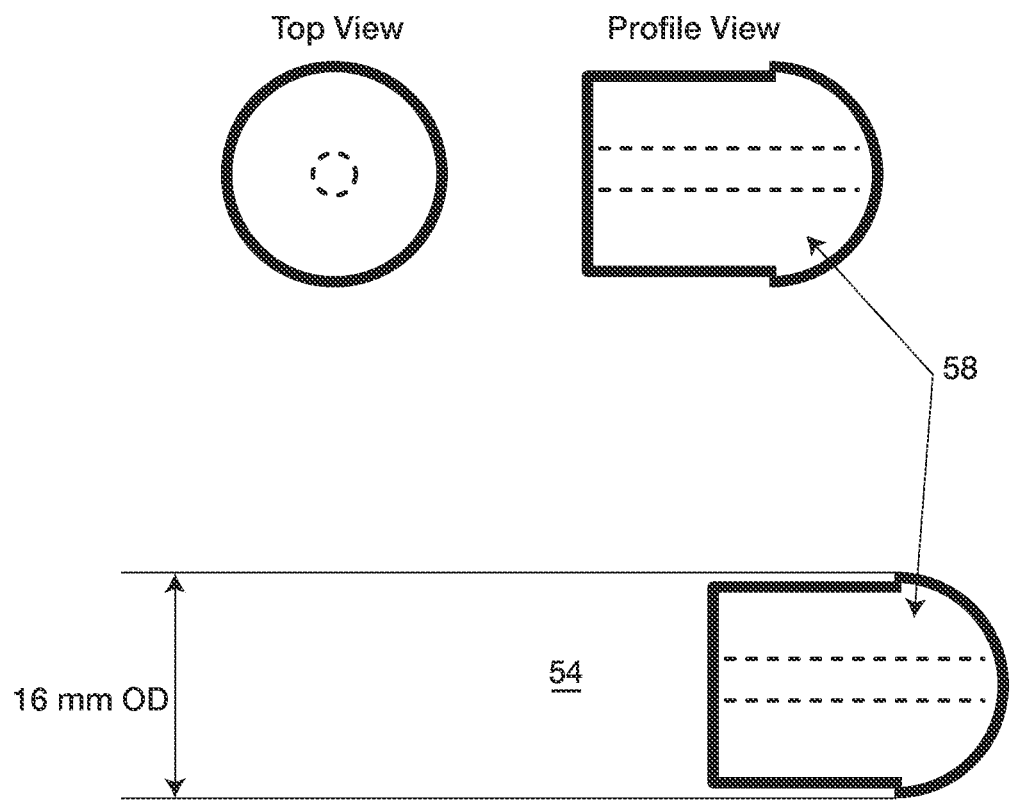
FIG. 15 depicts some structures of the trekking poles of the present invention.

Trekking poles of the present invention preferably include specialized end caps 58 depicted in FIG. 15. One end cap 58 is positioned at the upper end of the middle elongation segment. In some assemblies the top elongation segment that includes the handle is removed and the remainder of the trekking pole is used for stabilizing the flexible seat. End caps eliminate sharp edges which could wear down rear sleeve of flexible seat, and provide structural support to the end of the tubular elongation segment. As can be seen the end cap defines a longitudinal hole which allows air flow and prevents trapped water from collecting.

In use, one unfurls tubular frame 32 and allows shock cord 33 to align interconnected components, for example tube segments and hubs. Components are engaged as necessary, for example tube segments are inserted into hubs, and tubular frame 32 is positioned on subsurface with front and rear footings 36, 46 positioned downwardly. Upper terminal end of trekking poles 50, for example handles 52 if present, are inserted into rear sleeves 24 of flexible seat 20, with one terminal end per sleeve. If using trekking poles of the present invention one may remove uppermost elongated member so that end cap 58 is at upper terminal end of trekking pole. Tips 57 of trekking poles 50 are lowered into rear hub apertures 41 of rear hub, so tips are properly positioned by centering members 45, with one tip per aperture. Upper supports 34 of tubular frame 32 are inserted into front sleeves 22 of flexible seat 20, with one support per sleeve. Trekking poles having adjustable lengths can be elongated for a more upright chair back position, or shortened for a more reclined chair back position.

It should be understood that the foregoing relates to exemplary embodiments of the invention and that modifications may be made without departing from the spirit and scope of the invention as set forth in the following claims. By way of example, in the described invention female apertures 31, 41 receive male tubes and trekking pole tips, but hubs could define male projections which mate with female tubes and/or trekking pole tips. Also, the system of the present invention may include trekking poles of the present invention. Terms such as "substantially" and the like shall mean within reasonable bounds when considering limitations such as machines, materials, manufacturing methods, and people. By way of example, a "substantially smooth" surface means there are no intentional bumps or irregularities. All ranges set forth herein include the endpoints as well as all increments there between, even if not specifically stated. By way of example 1 to 2 inches includes 1 inch, 1.000001 inches and so forth. Finally, unless otherwise stated or contrary to common sense, "approximate" and the like shall mean +/−10%.

What is claimed is:

1. A hiking system including:
   A. A tubular frame including a front hub and a rear hub;
   B. A pair of upper supports releasably engaged with said front hub;
   C. A flexible seat releasably engaged with said pair of upper supports; and
   D. A pair of trekking poles including a distal tip and a proximal fully detachable longitudinally-oriented handle defining a gripping portion sized and shaped such that a human hand grasping said gripping portion is hindered in sliding said hand longitudinally upwardly and longitudinally downwardly along said handle, wherein said pair of trekking poles are releasably engaged with said rear hub by lowering said assembled trekking poles tip-first into said rear hub.

2. The hiking system of claim 1 wherein said pair of trekking poles is releasably engaged with said flexible seat.

3. The hiking system of claim 1 further including a plurality of front footings extending downwardly from said front hub.

4. The hiking system of claim 3 further including a plurality of rear footings extending downwardly from said rear hub.

5. The hiking system of claim 4 further including a cross bar spanning said front hub and said rear hub.

6. The hiking system of claim 1 wherein each trekking pole of said pair of trekking poles includes three elongation segments having a telescoping orientation.

7. The hiking system of claim 6 wherein at least one of said elongation segments includes an end cap.

8. The hiking system of claim 7 wherein said end cap defines a longitudinal channel.

9. A chair system including:
   A. A flexible seat forming a back portion and a leg portion;
   B. A tubular frame for stabilizing said flexible seat, said tubular frame including a rear hub; and
   C. A pair of adjustable length trekking poles releasably engaged with said flexible seat, wherein each of said trekking poles includes a distal tip and a proximal fully detachable longitudinally-oriented handle defining a gripping portion sized and shaped such that a human hand grasping said gripping portion is hindered in sliding said hand longitudinally upwardly and longitudinally downwardly along said handle, wherein said pair of trekking poles are releasably engaged with said rear hub by lowering said assembled trekking poles tip-first into said rear hub, and wherein said flexible seat transitions between a reclining position and an upright position by adjusting the length of said trekking poles.

10. The chair system of claim 9 wherein said back portion is approximately 40°—approximately 50° relative to horizontal plane, and said leg portion is approximately 23°—approximately 33° relative to horizontal plane when said flexible seat is in said reclining position.

11. The chair system of claim 9 wherein said back portion is approximately 55°—approximately 65° relative to horizontal plane, and said leg portion is approximately 8°—approximately 18° relative to horizontal plane when said flexible seat is in said upright position.

12. The chair system of claim 9 wherein adjusting the length of said trekking poles is the sole means of transitioning said flexible seat between a reclining position and an upright position.

13. The chair system of claim 9 wherein the weight, not including said trekking poles, does not exceed approximately 27 ounces.

14. A method of assembling a chair system including the acts of:
   A. Unfurling a tubular frame and allowing a shock cord to align interconnected components;
   B. Engaging adjoining said components one to the other;
   C. Releasably engaging proximal ends of trekking poles with a flexible seat; and
   D. Releasably engaging distal ends of said trekking poles with a rear hub fixed to said tubular frame by lowering assembled trekking poles tip-first into said rear hub, wherein said trekking poles each include a fully detachable longitudinally-oriented handle defining a gripping portion sized and shaped such that a human hand grasping said gripping portion is hindered in sliding said hand longitudinally upwardly and longitudinally downwardly along said handle.

15. The method of claim 14 further including the step of shortening the length of said trekking poles to orient said flexible seat in a reclining position.

16. The method of claim 14 further including the step of elongating said trekking poles to orient said flexible seat in an upright position.

17. The method of claim 14 further including the step of storing said tubular frame and said flexible seat in a stuff bag.

18. The hiking system of claim 1 wherein said trekking poles have pointed tips.

19. The chair system of claim 9 wherein said trekking poles have pointed tips.

\* \* \* \* \*